United States Patent [19]

Kohno et al.

[11] Patent Number: 5,415,062
[45] Date of Patent: May 16, 1995

[54] VIBRATION DAMPER

[75] Inventors: Satoshi Kohno; Hirofumi Ara; Tatsuya Morishita; Shizuaki Hidaka; Koji Yamaguchi; Tsutomi Ischidaka, all of Atsugi, Japan

[73] Assignee: Atsugi Unisia Corporation, Japan

[21] Appl. No.: 180,496

[22] Filed: Jan. 12, 1994

Related U.S. Application Data

[63] Continuation of Ser. No. 701,053, May 16, 1991, abandoned.

[30] Foreign Application Priority Data

May 16, 1990 [JP] Japan .................. 2-126378
Jan. 23, 1991 [JP] Japan .................. 3-006054

[51] Int. Cl.$^6$ ............................................. F16F 15/10
[52] U.S. Cl. ............................ 74/574; 74/572; 464/68; 192/106.2
[58] Field of Search ........................ 74/572-574; 192/106.1, 106.2, 70.17, 70.18; 464/66, 68

[56] References Cited

U.S. PATENT DOCUMENTS

| | | | |
|---|---|---|---|
| 4,468,207 | 8/1984 | Yoshida ........................ | 464/66 |
| 4,611,701 | 9/1986 | Friedmann ..................... | 192/110 B |
| 4,820,239 | 4/1989 | Despres et al. ................ | 192/106.2 X |
| 4,828,533 | 5/1989 | Focqueur et al. ............... | 464/68 X |
| 4,844,224 | 7/1989 | Fukushima ..................... | 74/574 X |
| 4,856,639 | 8/1989 | Fukushima ..................... | 74/574 X |
| 4,890,710 | 1/1990 | Reik et al. .................... | 74/574 X |
| 4,905,539 | 3/1990 | Naudin et al. .................. | 192/106.2 X |
| 4,928,486 | 5/1990 | Despres ........................ | 74/574 X |
| 4,961,487 | 10/1990 | Langeneckert .................. | 74/574 X |
| 5,017,178 | 5/1991 | Krikke et al. ................... | 464/66 X |
| 5,052,244 | 10/1991 | Kamiya et al. .................. | 464/66 X |
| 5,062,517 | 11/1991 | Muchmore et al. ............... | 74/574 X |
| 5,083,981 | 1/1992 | Förster ......................... | 74/574 X |
| 5,097,721 | 3/1992 | Umeyama ....................... | 74/574 |
| 5,097,722 | 3/1992 | Fukushima ..................... | 464/68 X |
| 5,111,714 | 5/1992 | Honoki et al. .................. | 74/574 |
| 5,156,067 | 7/1992 | Umeyama ....................... | 74/572 X |
| 5,156,249 | 10/1992 | Friedmann ..................... | 464/68 X |

FOREIGN PATENT DOCUMENTS

| | | | |
|---|---|---|---|
| 361732 | 4/1990 | European Pat. Off. ............ | 74/574 |
| 2617934 | 1/1989 | France ......................... | 74/574 |
| 3447925 | 1/1986 | Germany ....................... | 74/574 |
| 3920587 | 1/1990 | Germany ....................... | 74/574 |
| 3901571 | 8/1990 | Germany ....................... | 74/574 |
| 57-18049 | 4/1982 | Japan . | |
| 58-36220 | 8/1983 | Japan . | |
| 63-26425 | 2/1988 | Japan . | |
| 63-251644 | 10/1988 | Japan ........................... | 74/574 |
| 63-318343 | 12/1988 | Japan . | |
| 1206136 | 8/1989 | Japan . | |
| WO89/01097 | 2/1989 | WIPO ........................... | 74/574 |

OTHER PUBLICATIONS

Goodheart-Willcox, *Automotive Encyclopedia* (part, * unknown) show a crankshaft with a flywheel and a vibration damper (see Fig. 7-3, and the discussion on p. 73). Fig. 7-5 and the discussion at pp. 74-75 relate to the makings of a typical vibration damper.

*Primary Examiner*—Vinh T. Luong
*Attorney, Agent, or Firm*—Ronald P. Kananen

[57] ABSTRACT

A vibration damper assembly comprises a torsional vibration damper with torsional springs, a mass body, and a resilient drive plate which serves as a bending stress damper. With a bearing on a reinforcement block connected to the crankshaft, the torsional vibration damper has an output member rotatably supported by the crankshaft. The resilient driver plate is operatively disposed in torque transmission relationship between the crankshaft and the mass body in such a manner as to coextend radially outwardly from the crankshaft with the torsional vibration damper.

5 Claims, 3 Drawing Sheets

VIBRATION DAMPER

This application is a continuation of application Ser. No. 07/701,053 filed May 16, 1991, now abandoned.

BACKGROUND OF THE INVENTION

The present invention relates to a vibration damper assembly for an engine having a crankshaft, which vibration damper assembly is disposed between the engine crankshaft and a torque transmitting device such as a friction type clutch or a hydraulic torque converter.

Japanese Patent Second (examined) Publication (Tokkosho) 57-18049 (JP-B2) discloses a vibration damper assembly for an internal combustion engine. This known vibration damper assembly comprises a torsional vibration damper including torsional springs, and a resilient drive plate which serves as a bending stress damper. Two mass bodies serve as an input member and an output member of the torsional vibration damper. The resilient drive plate has an inner peripheral portion connected to the crankshaft at a rear end thereof, and an outer peripheral portion connected to the input member of the torsional vibration damper. The output member of the torsional vibration damper is rotatably supported via a bearing on a main drive shaft.

According to this known damper assembly, as the resilient drive plate is disposed radially inward of the input member of the torsional vibration damper, it is difficult to increase a radial dimension of the resilient drive plate to a satisfactory level in relation to the thickness thereof. Further, as the output member of the torsional vibration damper is rotatably mounted on the main drive shaft near its axial end, the main drive shaft must have sufficient strength to support the same.

An object of the present invention is to provide a vibration damper assembly in which, without any increase in an outer diameter of the assembly, a radial dimension of a resilient drive plate may be increased to a satisfactory level in relation to a thickness thereof, thus facillitating adjustment of the bending vibration characteristic of the resilient drive plate and enables a desired power transmission characteristic through the vibration damper assembly to be achieved.

SUMMARY OF THE INVENTION

According to the present invention, there is provided a vibration damper assembly for an engine having a crankshaft, comprising:
- a torsional vibration damper including an input member, an output member, and torsional springs operatively disposed between said input and output members, said input member having an inner peripheral portion and an outer peripheral portion;
- a mass body;
- a resilient drive plate operatively connected between the crankshaft and said mass body for transmission of a torque, said resilient drive plate having an inner peripheral portion and an outer peripheral portion;
- wherein said resilient drive plate is operatively disposed in torque transmission relationship between the crankshaft and said mass body in such a manner as to coextend radially outwardly from the crankshaft with said torsional vibration damper.

According to one feature of embodiments of the present invention, the torsional vibration damper is supported by the crankshaft and supports the mass body, making it unnecessary for a main drive shaft to support the torsional vibration damper or the mass body.

DETAILED DESCRIPTION OF THE INVENTION

Figure 1:
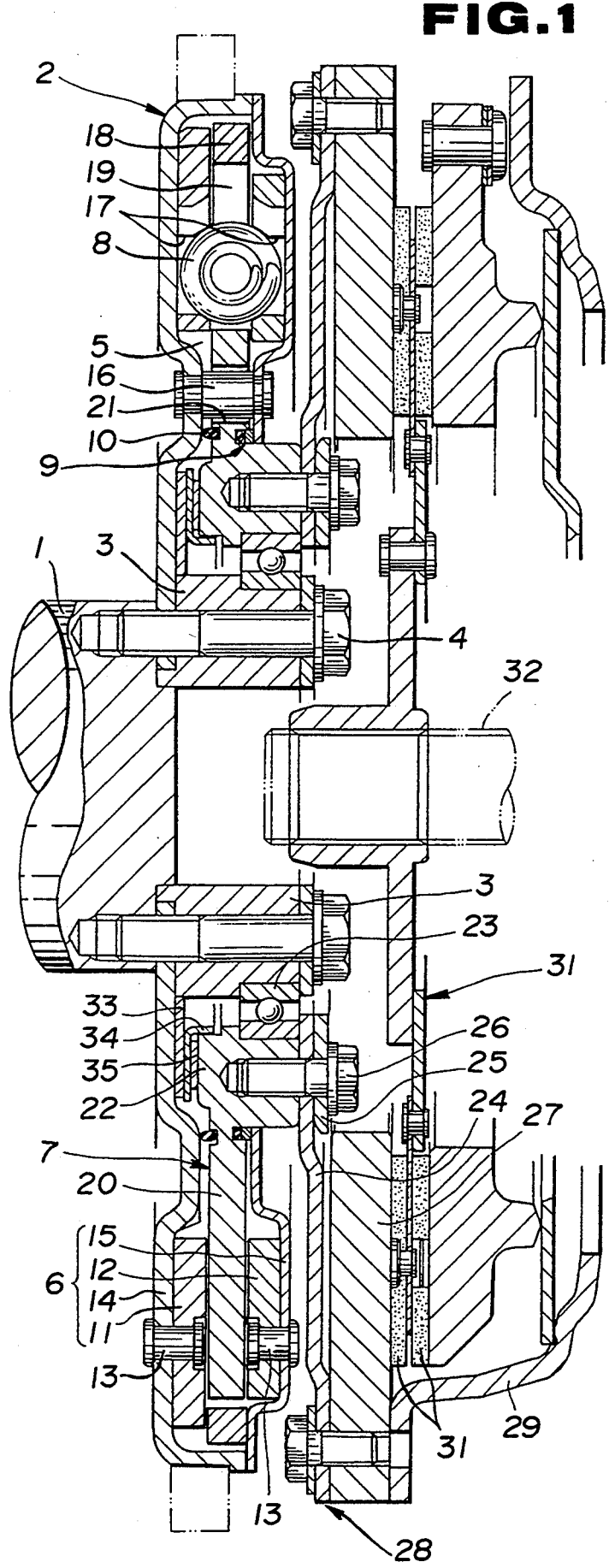
FIG. 1 is a sectional view of a first embodiment of a vibration damper assembly according to the present invention disposed between a crankshaft of an engine and a torque transmitting device in the form of a single plate, dry disc clutch.

Referring to FIG. 1, there is shown a portion of an internal combustion engine including a crankshaft 1. A vibration damper assembly comprises a torsional vibration damper 2 including an input member 6, an output member 7, and torsional springs 8 disposed between the input and output members 6 and 7. The vibration damper assembly also comprises a hydraulic damper including a liquid-filled chamber 5 defined between the input and output member 6 and 7 in a fluid tight manner by means of seals 9 and 10.

The torsional vibration damper 2 is arranged around a bearing retainer sleeve 3 which is fixedly secured to a rear end of the crankshaft 1 by means of a plurality of bolts 4. The inner member 6 includes a pair of drive plates 14 and 15 with annular sub-plates 11 and 12. The sub-plate 11 is attached to an inner side of the drive plate 14 by means of a plurality of rivets, only one being shown at 13, while the other sub-plate 12 is attached to an inner side of the other drive plate 15 by means of a plurality of rivets, only one being shown at 13. The annular plates 11 and 13 are opposed to and spaced to allow a radially extending disc portion 20 of the output member 7 to extend therebetween. The drive plates 14 and 15 are welded at their outer peripheries and carry a plurality of stop pins, only one being shown at 16. The sub-plates 11 and 12 are formed with a plurality sets of circumferentially arranged windows, only one set being shown at 17.

Each set of windows 17 receives a "pair" of torsion springs 8. A plurality of floating members 18 are arranged to be movable with respect to the input and output members 6 and 7. Each of the floating members has an arm 19 which cooperates with a "pair" of torsion springs 8. Relative movement of the floating members causes compression of the torsion springs 8.

The disc portion 20 of the output member 7 extends from an annular hub portion 22 and is formed with a plurality of stopper grooves 21 which receive the stopper pins 16, respectively. Clearances are formed between the disc portion 20 and the sub-plates 11 and 12 and these clearances are filled with liquid so that relative rotational movement between the output member 7 to the input member 6 is resisted by the viscosity of the liquid.

The drive plate 14 of the input member 6 has an inner peripheral portion interposed between the rear end of the crankshaft 1 and the bearing retainer 3 and fixedly secured to the crankshaft by means of the bolts 4. The hub portion 22 of the output member 7 is rotatably supported by a bearing 23 on the bearing retainer 3.

Operatively disposed between a front axial end of the hub portion 22 and the opposed inner side of the drive plate 14 are a washer 33, a plate 34 and a disc spring 35. Fixedly secured to a rear axial end of the hub portion 22 is a resilient drive plate 24. The resilient drive plate 24 has an inner peripheral portion secured to the hub portion 22 by means of a plurality of bolts 26 and coxtends radially outwardly with the torsional vibration damper 2. Disposed between the inner peripheral portion of the resilient drive plate 24 and the bolts 26 is a reinforcement annular plate 25. The resilient drive plate has an outer peripheral portion fixedly secured to an annular mass body or disc 27 to support same.

The previously described torsional damper 2, resilient drive plate 24 and annular mass body 27 cooperate with each other to form a flywheel 28. A clutch cover 29 has an outer peripheral portion attached to the annular mass body 27. Within the clutch cover 29 is disposed a clutch disc 30 with clutch facings 31. The clutch disc 30 is splined to a main drive shaft 32.

In operation, with the clutch disc 30 in firm engagement with the mass body 27, there occurs a relative rotational displacement between the input member 6 fixedly connected to the crankshaft 1 and the output member 7 fixedly supporting the mass body 27 upon transmission of torque from the crankshaft 1 to the main drive shaft 32. This relative displacement is resisted by the torsional vibration damper 2 mechanically by torsional springs 8 and hydraulically by the liquid within the chamber 5. Thus, the torque is smoothly transmitted to the main drive shaft 32. Torsional vibration induced by the crankshaft 1 is effectively reduced by the torsional vibration damper 2.

From the preceding description of the first embodiment, it will be appreciated that since the resilient drive plate 24 coextends radially outwardly from an extended axis of the crankshaft 1 with the torsional vibration damper 2, the outer diameter of the resilient drive plate 24 is not limited by the vibration damper 2, resulting in an increased freedom in designing the outer diameter of the resilient drive plate in relation to the thickness thereof. Thus, it is easy to adjust a bending stress vibration characteristic of the resilient drive plate 24 to fit to power transmission conditions. Therefore, the natural frequency of the crankshaft system owing to bending stress can be shifted out of the normally used frequency range, resulting in considerable reduction in bending vibration of the crankshaft system.

Thus, a so-called cabin confined noise is considerably reduced.

Since the mass body is not supported by the main drive shaft, the amount of load on the main drive shaft is considerably reduced.

Figure 2:
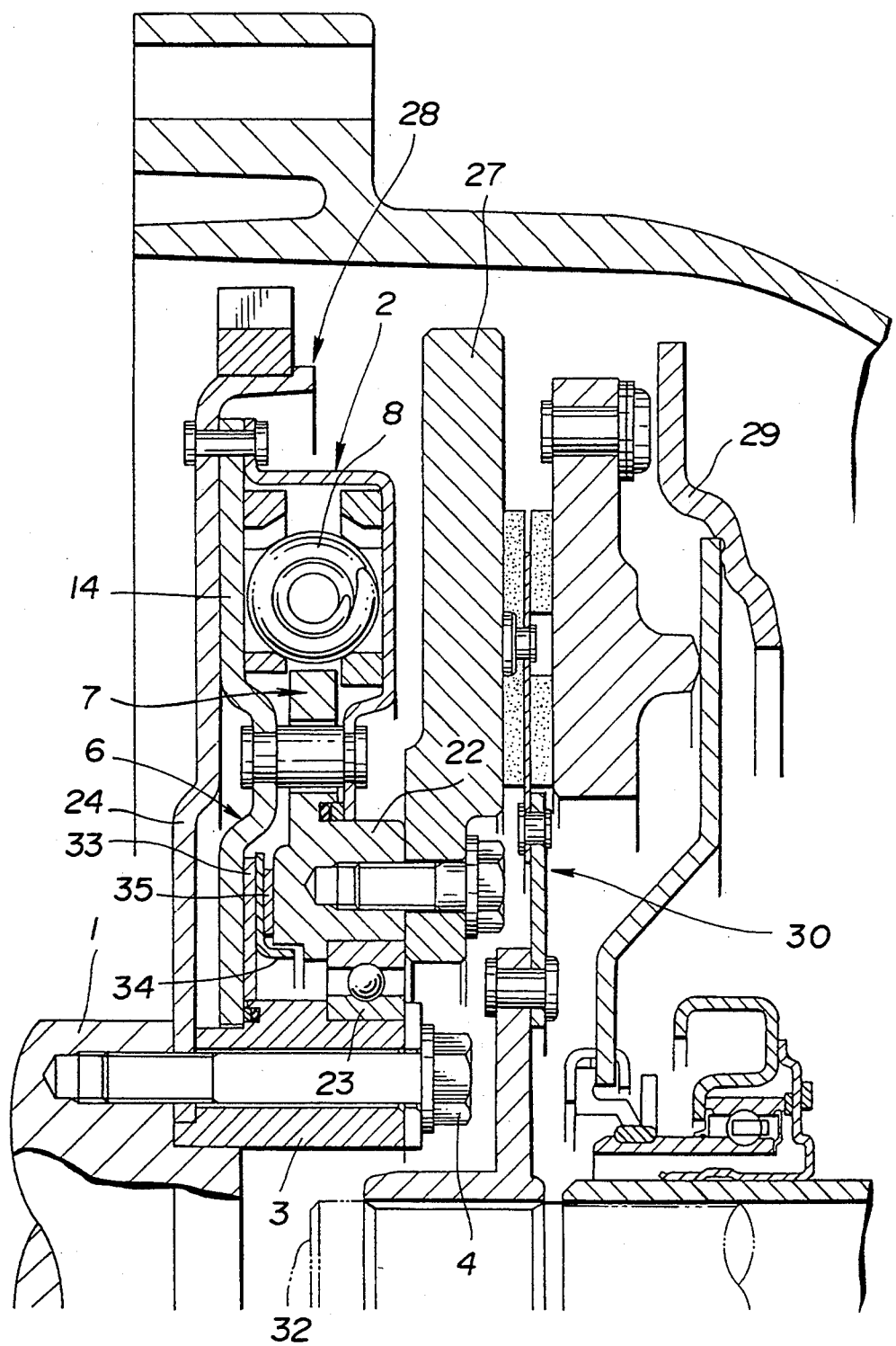
FIG. 2 is a fragmentary section of a second embodiment of a vibration damper assembly according to the present invention.

Referring to FIG. 2, the second embodiment is described. This embodiment is different from the first embodiment in that an annular mass body 27 has an inner peripheral portion fixedly attached to a rear axial end of a hub portion 22 of an output member 7 of a torsional vibration damper 2, a drive plate 14 of an input member 6 of the torsional vibration damper 2 is not connected to a crankshaft 1, and a resilient drive plate 24 has an inner peripheral portion fixedly interposed between a rear end of the crankshaft 1 and a bearing carrier 3 by bolts 3 to be fixedly connected to the crankshaft 1. The resilient drive plate 24 coextends radially outwardly from the crankshaft 1 with the torsional vibration damper 2 and has an outer peripheral portion fixedly revitted to the input member 6 of the torsional vibration damper 2 at an outer peripheral portion thereof.

Figure 3:
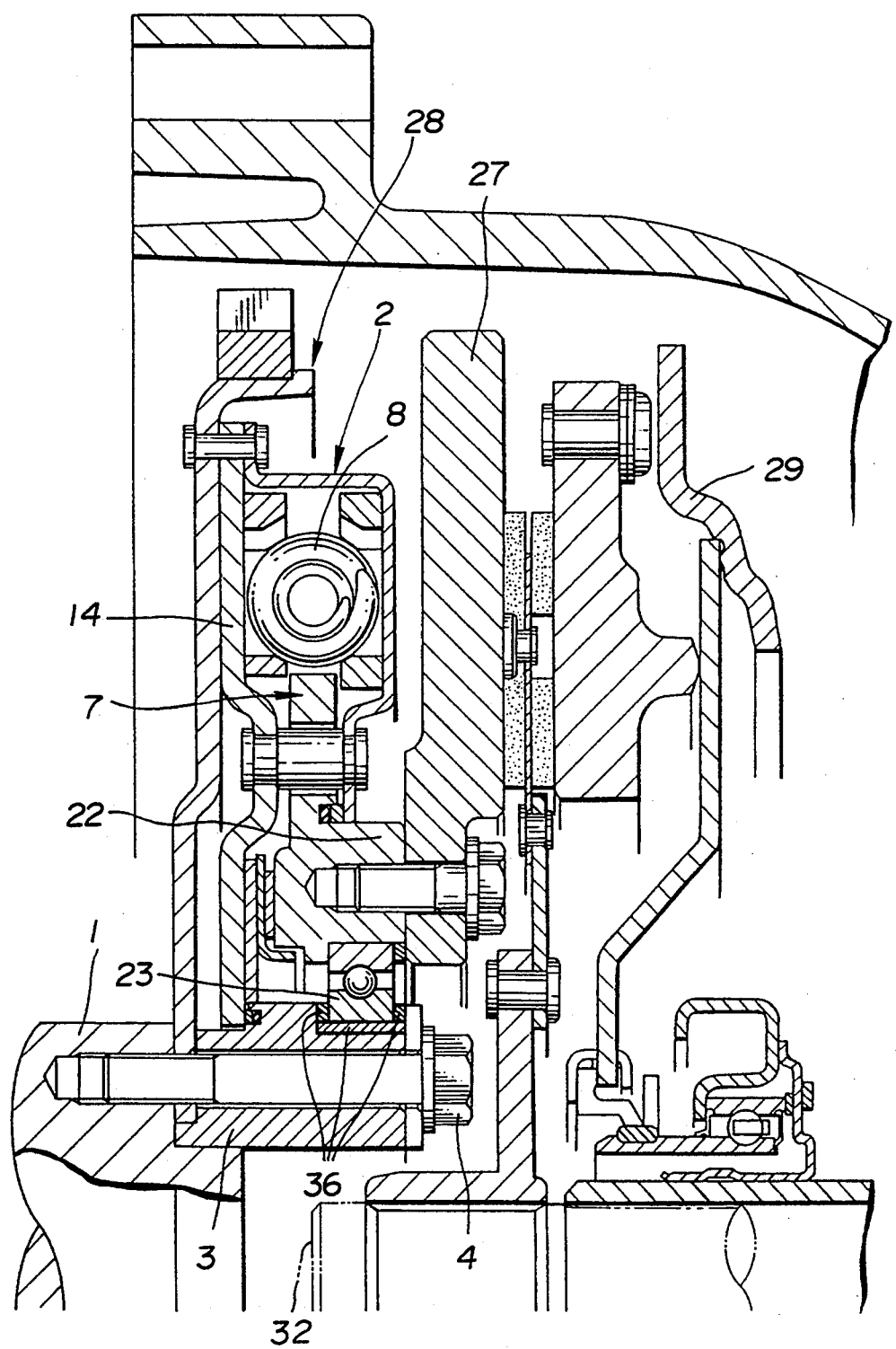
FIG. 3 is a view similar to FIG. 2 showing a third embodiment of a vibration damper assembly according to the present invention.

Referring to FIG. 3, the third embodiment is described. This embodiment is substantially identical with the second embodiment shown in FIG. 2 except the provision of elastomers 36 between an inner race of a bearing 23 and a bearing retainer 3. These elastomers 36 function to isolate or at least reduce transmission of vibrational force from the bearing retainer 3 fixed to a crankshaft 1 to a hub portion 22 to which a mass body 27 is fixedly secured.

What is claimed is:

1. A vibration damper assembly for an engine having a crankshaft, comprising:
    a torsional vibration damper including an input member, an output member, and torsional springs which resiliently interconnect said input and output members, said input member having an inner peripheral portion fixedly secured to the crankshaft and an outer peripheral portion;
    a bearing retainer fixedly secured to the crankshaft and supporting a bearing;
    said output member of said torsional vibration damper including a hub portion rotatably supported by said bearing;
    a mass body; and
    a resilient drive plate having an inner peripheral portion fixedly secured to said hub portion of said output member of said torsional vibration damper and an outer peripheral portion fixedly secured to said mass body so that an outer diameter of the resilient drive plate is not limited by the vibration damper in relation to its thickness facilitating an adjustment of a vibration characteristic of said resilient drive plate relative to power transmission conditions.

2. A vibration damper assembly as claimed in claim 1, wherein said resilient drive plate is resilient to vibration which is produced by a bending stress produced when torque is transmitted between the crankshaft and said mass body.

3. A vibration damper assembly for an engine having a crankshaft, comprising:
    a resilient drive plate having an inner peripheral portion fixedly secured to the crankshaft and an outer peripheral portion;
    a torsional vibration damper including an input member, an output member, and torsional springs which resiliently interconnect said input and output members, said input member having an inner peripheral portion separated from the crankshaft and an outer peripheral portion fixedly secured to said outer peripheral portion of said resilient drive plate;
    a bearing retainer fixedly secured to the crankshaft and supporting a bearing;
    said output member of said torsional vibration damper including a hub portion rotatably supported to said bearing; and
    a mass body fixedly secured to said hub portion of said output member of said torsional vibration damper, said outer peripheral portion of said resilient drive plate being fixedly secured to said mass body.

4. A vibration damper assembly as claimed in claim 3, wherein said resilient drive plate is resilient to vibration which is produced by a bending stress produced when torque is transmitted between the crankshaft and said mass body.

5. A vibration damper assembly for an engine having a crankshaft, comprising:

a torsional vibration damper supported by the crankshaft and including an input member having an inner peripheral portion operatively connected to the crankshaft and an outer peripheral portion, an output member, and torsional springs operatively disposed between said input and output members; and a resilient drive plate supported by the crankshaft and having an inner periphery operatively connected to the crankshaft and an outer periphery operatively connected to the mass body for transmission of torque from the crankshaft to the mass body, wherein the improvement is that the mass body is operatively connected to the output member of the torsional vibration damper, and that the resilient drive plate extends away from the axis of the crankshaft as far as the outer periphery of the input member of the torsional vibration damper.

* * * * *